United States Patent
LeBuffe

(10) Patent No.: US 7,226,242 B2
(45) Date of Patent: Jun. 5, 2007

(54) CATCH BASIN FOR SALT WATER SAND

(76) Inventor: Calvin LeBuffe, 7826 Kavanagh Ct., Sarasota, FL (US) 34240

( * ) Notice: Subject to any disclaimer, the term of this patent is extended or adjusted under 35 U.S.C. 154(b) by 17 days.

(21) Appl. No.: 11/528,289

(22) Filed: Sep. 26, 2006

(65) Prior Publication Data

US 2007/0020049 A1    Jan. 25, 2007

(51) Int. Cl.
*E02B 8/02* (2006.01)
*B01D 21/00* (2006.01)

(52) U.S. Cl. ............... 405/74; 210/170.01; 210/170.11; 405/52

(58) Field of Classification Search ............... 405/36, 405/50, 52; 210/170.01, 170.09, 170.11
See application file for complete search history.

(56) References Cited

U.S. PATENT DOCUMENTS

| | | | |
|---|---|---|---|
| 2,436,630 A | 2/1948 | Clegg | |
| 4,023,369 A | 5/1977 | Wirasinha | |
| 4,031,009 A | 6/1977 | Hicks | |
| 4,498,806 A | 2/1985 | Szonnell | |
| 4,902,430 A * | 2/1990 | Peterson | 210/747 |
| 5,174,681 A | 12/1992 | Atkinson et al. | |
| 5,888,020 A | 3/1999 | Brais et al. | |
| 5,895,174 A * | 4/1999 | Beaver | 405/30 |
| 6,481,926 B2 | 11/2002 | Benedict et al. | |

\* cited by examiner

*Primary Examiner*—Tara L. Mayo
(74) *Attorney, Agent, or Firm*—National IP Rights Center

(57) ABSTRACT

A system for collecting the flow of sand or sediment in a current comprising a catch basin, comprising a base structure having a bottom and a plurality of angled side walls, said bottom having at least one aperture, an external pipe affixed at a first end to the at least one aperture, at least two guides affixed to one or more ends of the catch basin to direct sand and sediment into the catch basin, each of said guides comprising a chute with curved sidewalls extending substantially parallel to the flow of current and a pumping system affixed to the second end of the external pipe to remove the sediment or sand from the basin.

2 Claims, 13 Drawing Sheets

CATCH BASIN FOR SALT WATER SAND

CLAIM OF PRIORITY

This application claims benefit to non-provisional application Ser. No. 10/984,182, filed Nov. 8, 2004, entitled "Catch Basin for Salt Water Sand", now abandoned which further claims benefit to provisional application 60/589,720, filed on Jul. 21, 2004 entitled "Catch Basin for Salt Water Sand", which are incorporated by reference herein in their entirety.

FIELD OF THE INVENTION

This invention relates to an apparatus and method for preventing the formation of sandbars caused by current or tidal flow at passages such as the inlets to harbors, basins and estuaries.

BACKGROUND OF THE INVENTION

Sand and sediment tends to accumulate in locations such as the entrances to harbors due to the deposit of sand and sediment by tidal flow of water. The existence of sandbars can create serious environmental and navigational hazards. Such accumulations require at least periodic dredging at great expense and disruption of water traffic.

The present invention is directed to a novel system which eliminates the accumulation of the sand or sediment that would normally be deposited on the bottom of an inlet, into a permanently located catch basin from which the sand/sediment can be continuously or periodically removed by water pumps capable of moving water and sand.

A number of U.S. patents have been devoted to the problem of preventing beach erosion and the like. U.S. Pat. No. 4,498,806 discloses a beach erosion jetty configuration wherein the jetties are curved to stop or prevent a vacuum effect which causes beach erosion. Swift currents running in or out of inlets create a Venturi effect that pulls sand-laden waters from nearby and sometimes distant shorelines. In accordance with the present invention, jetties are provided with curved ends that negate the loss of precious sand. Such curved jetties function as erosion control devices and actually stop and prevent erosion.

U.S. Pat. No. 4,023,369 discloses an apparatus and method carried out thereby for preventing formation of sand bars from sand or silt at the outlet of a body of water emptying from inland into another body of water, such as a lake or the sea and the like. At least one elongated gutter is provided at the outlet of a body of water from inland to another or receiving body of water, such as a lake or the sea. The gutter is disposed above the level of the water in the outlet and may or may not extend through the mouth of the outlet into the receiving body of water. Water is pumped into the gutter to an overflow condition so that it spills over the edges, and by gravity falls and creates a splash erosion condition.

U.S. Pat. No. 4,031,009 discloses a pre-cast reinforced concrete catch-basin of larger than conventional catch-basin dimensions, which includes a solid horizontal bottom wall with a solid, hollow, cylindrical side wall upstanding therefrom to about half the height of the catch-basin. The lower half thus forms a sealed, unapertured, undrained sump receptacle for collecting drain water and silt and allowing sand to settle out. The hollow, cylindrical, upper half contains leaching openings which extend through from the inside to the outside of the wall, from top to bottom, for discharging cleared water to the surrounding, stone-lined earth without plugging or clogging and without polluting nearby wells, brooks, etc.

U.S. Pat. No. 6,481,926 discloses a method and apparatus for land reclamation which includes utilizing groyne-like structures, including spaced stanchions to which are mounted porous screens and wherein the screens are vertically adjustable as material is deposited during the reclamation process. In some embodiments, the screens are carried by sleeves slidable on spaced stanchions. In other embodiments, the screens may be sectional and carried by multiple sleeves.

U.S. Pat. No. 5,174,681 discloses a permeable breakwater for submerged offshore or seawall retentive installation that includes a base and permeable opposed sides terminating at an upwardly projecting permeable wave wall. The breakwater is located offshore to cause moderate to heavy waves to break further offshore, thereby dissipating their energy before reaching the beach.

U.S. Pat. No. 5,888,020 discloses a sub-tidal platform adapted to be placed under water in front of a beach comprising a support structure having at least two upwardly extending, spaced-apart side walls extending along vertical planes. Each side wall has a bottom adapted to rest on a generally horizontal surface and a sloping, upwardly extending edge which is at an acute angle with respect to the bottom. A plurality of interconnecting members extends between the side walls for maintaining them in an upright position. The interconnecting members are positioned adjacent to the sloping edge of the side walls. A plurality of gates are pivotally connected to the interconnecting members of the support structure for controlling fluid flow through the space between the side walls. The gates open in response to incoming fluid flow through the gates and close in response to outgoing fluid flow in the opposite direction. The gates, when in their closed position, combine to form a sloping wall which substantially blocks the flow of fluid through the space between the side walls and deposits fluid-carried material in the space formed by the side walls and the sloped wall.

While there have been a number of prior art systems directed toward preventing beach erosion, there has not been a systems that adequately addresses the problem of preventing sand bar creation in inlets. There has not been a system that provides a simple, yet inventive basin which accumulates sand and sediment.

It is therefore an object of the present invention to provide a system which functions to prevent the accumulation of sediment in inlets and the like.

It is a further object of the present invention to provide a system for collecting sand and sediment, comprising singular or multi-piece casing.

It is an object of the present invention to provide a system which permits the removal of sand and sediment by means of a pump and piping.

These and other objects of the present invention will become apparent from the detailed description which follows.

SUMMARY OF THE INVENTION

In a preferred embodiment, the invention is a system for collecting the flow of sand or sediment in a current comprising a catch basin with a base structure having a bottom and a plurality of angled side walls, said bottom having at least one aperture, an external pipe affixed at a first end to the at least one aperture, at least two guides affixed to one or more ends of the catch basin to direct sand and sediment into the catch basin, each of said guides comprising a chute with curved sidewalls extending substantially parallel to the flow of current, and a pumping system affixed to the second end of the external pipe to remove the sediment or sand from the basin.

In a further embodiment, the invention is a system for collecting the flow of sand or sediment comprising a catch basin, further comprising a plurality of angled side walls which converge with a bottom wall, said catch basin being placed at a predetermined location within a waterway to collect sediment or sand, a plurality of apertures on the bottom wall of the catch basin to permit the removal of sediment or sand from the basin, a plurality of external pipes each affixed at a first end to an aperture, one or more pumping systems affixed to the second ends of the pipes to remove the sediment or sand from the catch basin, a screen affixed over the top of the basin to block debris and prevent the intrusion of sea life, and at least two guides affixed to one or more ends of the catch basin to direct sand and sediment into the catch basin, each of said guides comprising a chute with curved sidewalls extending substantially parallel to the flow of the current.

DETAILED DESCRIPTION OF THE INVENTION

The present invention is described with reference to the attached Figures. As shown in FIGS. 1 through 4, the apparatus of the invention which prevents sand bar formation includes a catch basin 10 which may be constructed from a pre-cast concrete or other composite material. The base is floated into position, or may be fabricated in sections and erected in the desired location.

Figure 4:
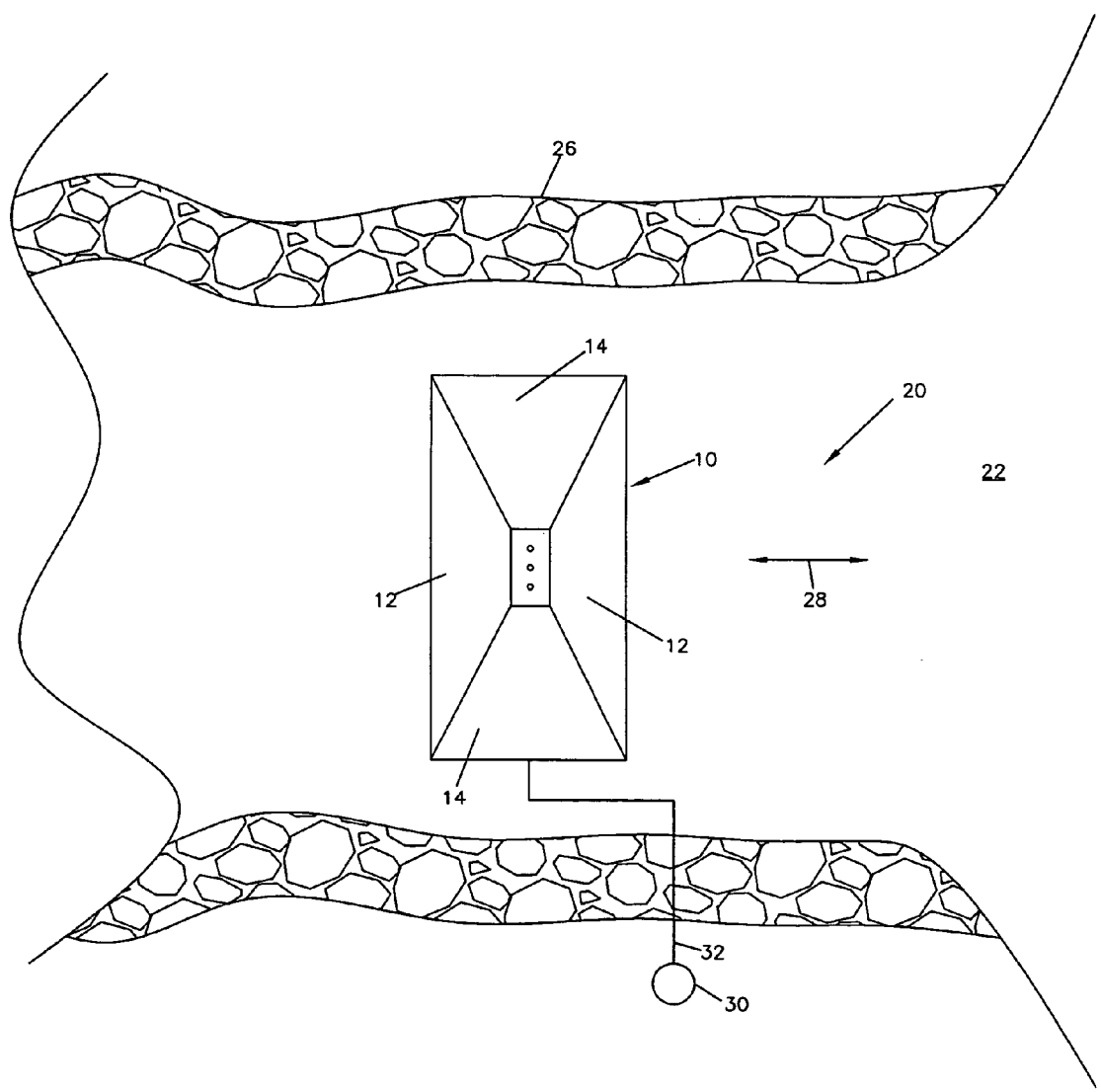
FIG. 4 is a diagrammatic view showing an example of the installation of the catch basin for the purpose of carrying out the method of the invention.

The catch basin 10, in accordance with the invention, will be constructed to have a length substantially equal to the width of the stream of water which creates the sand bars. This may be freely adjusted according to the situation. Alternatively, one or more catch basins 10, in accordance with the invention, may be placed end to end to form a continuous chain of catch basins for wider inlets. As shown in FIG. 4, the basin may be repositioned as deemed necessary by location in order to attract the greatest amount of current and sediment.

The catch basin 10 of the invention will typically have a width of twenty or more feet at its top with the sidewalls 12 tapering down and converging toward each other at an angle of approximately forty-five degrees. Similarly the end walls 14 converge toward each other. The converging walls 12 and 14 merge with a bottom portion 16, which is approximately two feet wide. The over all depth of the catch basin is preferably approximately ten feet. Both dimensions may be freely adjusted according to the need and usage.

The catch basin 10 can be constructed from concrete reinforced with glass fiber mesh or other appropriate composite material. The catch basin 10 can be pre-cast in one unitary body and floated to its desired position for installation. Alternatively, the basin may be constructed from layers, in layers or segments as illustrated in FIGS. 2 and 3 in which the various segments or layers 10a, 10b, 10c, 10d, and 10e can be positioned relative to each other and cemented into a permanent structure.

Figure 1:
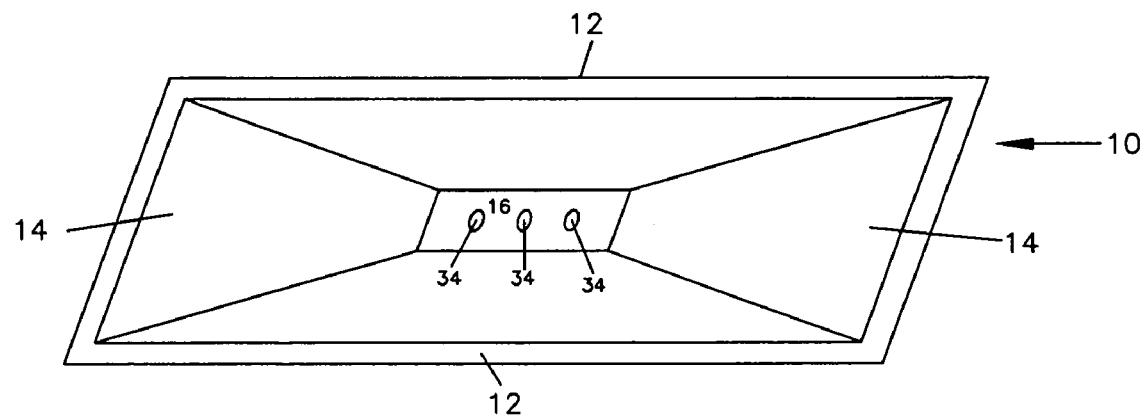
FIG. 1 is a perspective view of the catch basin forming part of the apparatus used in carrying out the method of the invention.
Figure 2:
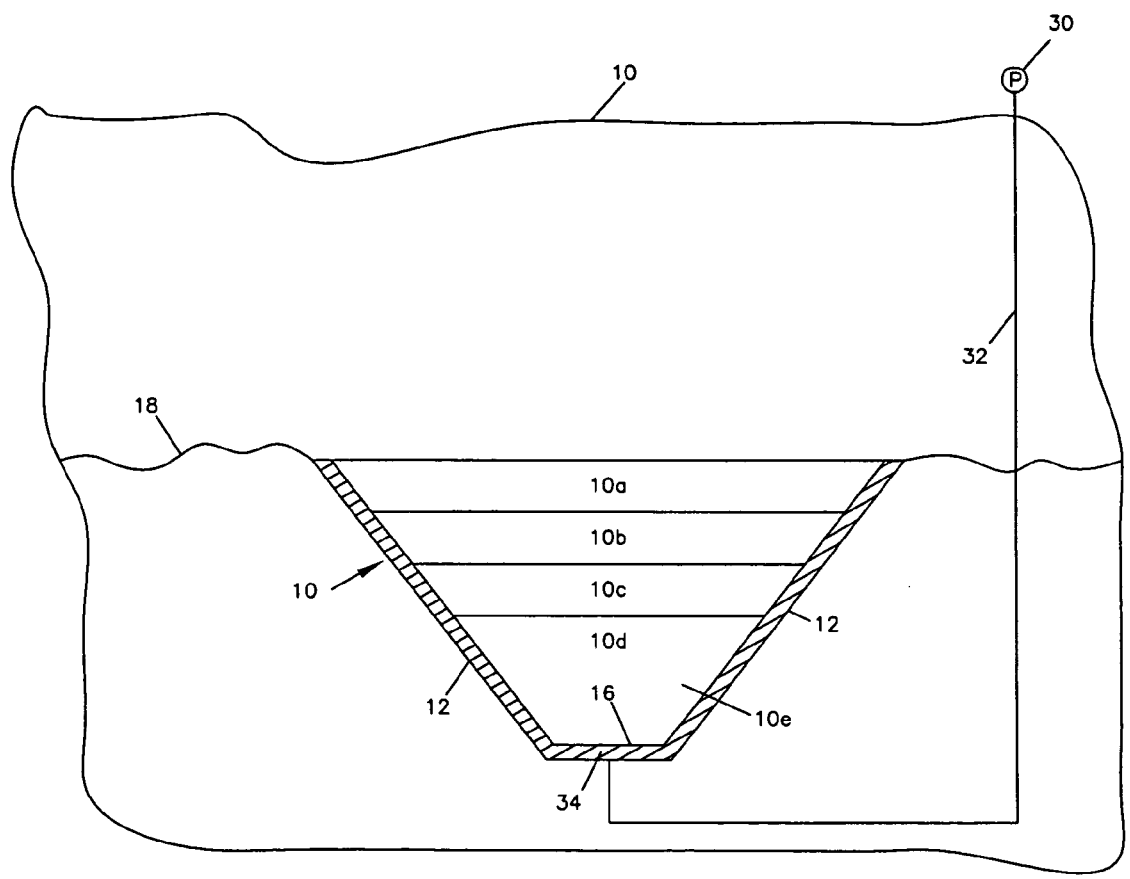
FIG. 2 is a cross-sectional view of the catch basin shown in FIG. 1.

Whether the catch basin 10 is formed as a unitary structure or of separate sections and cemented together, the location in the inlet would be below the desired bottom level of the inlet as illustrated in FIG. 2. In one embodiment, the depth could be at a depth of approximately ten feet below the mean water level indicated at 19 to ensure that vessels with no more than that draft could make passageway in the inlet. This may be adjusted according to need and usage.

Figure 3:
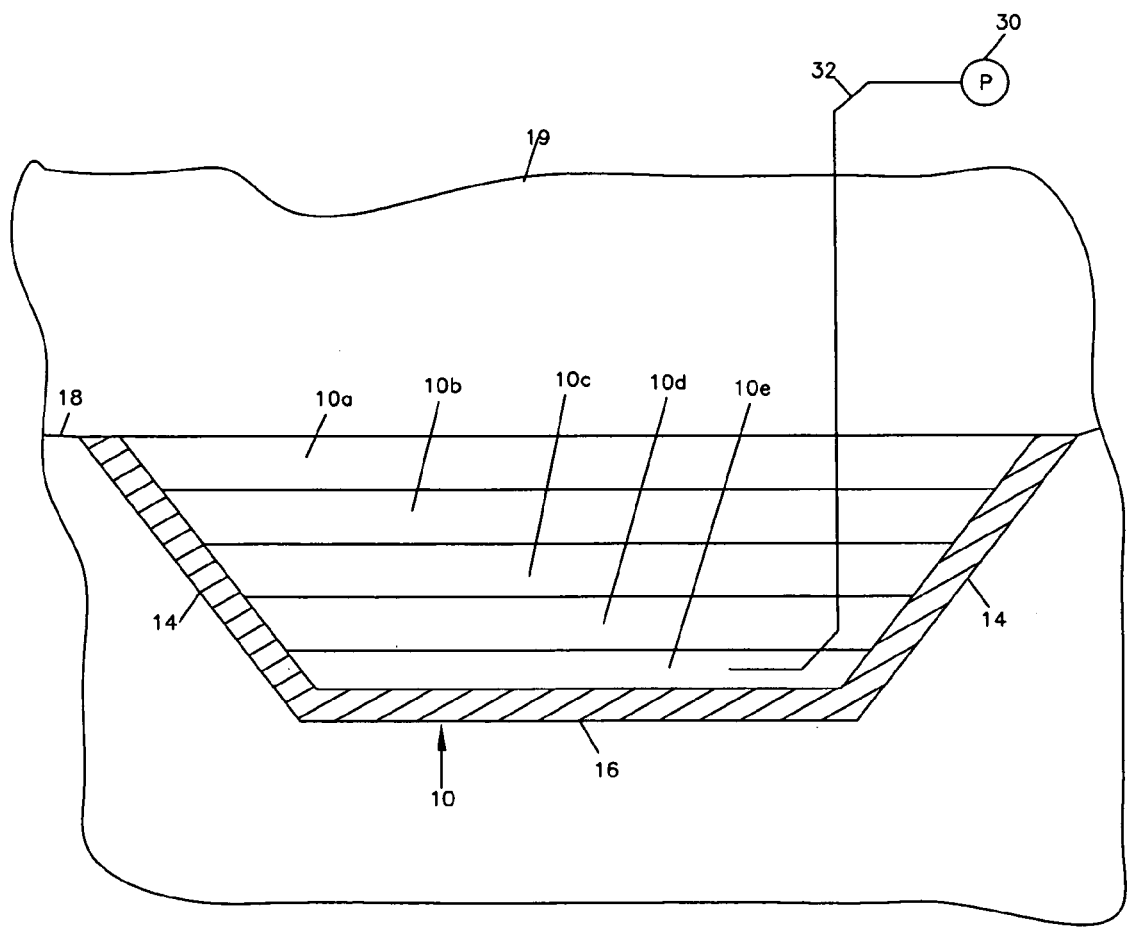
FIG. 3 is a longitudinal cross-sectional view of the catch basin of the present invention.

With the basin 10 disposed as illustrated in FIGS. 2 and 3, the tidal flow indicated by arrow 28 would cross the catch basin 10 and the sand carried by the tidal water would tend to be deposited into the catch basin rather than on the normal bottom of the passageway or inlet 20. The sand or sediment, thus accumulated, can be periodically removed by pumps 30 and pipes 32, which could be permanently connected to openings 34 in the bottom of the basin 10 as illustrated in FIG. 2 or temporarily as illustrated diagrammatically in FIG. 3. The number and nature of the parts will be determined according to the size and volume of the sediment addressed.

The catch basin 10 is preferably formed so that its interior walls are substantially smooth. This permits the movement of accumulated sand and sediment toward the bottom of the catch basin 10.

It is anticipated that the catch basin 10 can be located in various locations such as the outlets of rivers or wherever sand bars tend to form so that the sand and sediment that otherwise would be deposited from the current to the bottom of the water is accumulated in a predetermined position from which it can be pumped to locations on the upland and permitted to dry.

From its fixed location, the sand and sediment can be transported to other locations such as beach replenishment areas or land fill areas. An example of such an installation is shown in FIG. 4 in which an inlet 20 opens to the sea 22 and forms a passage of water between the sea 22 and a bay or the like, not shown. Jetties 26 located at opposite sides of the inlet 20 can be formed of stone and concrete. Tidal flow would thus be directed in both directions within the inlet 20. The flowing water at least from the sea will have sand or silt in suspension so that as the velocity of the water flow decreases at slack tide, the sand or sediment suspended within the water tends to be deposited in the outlet creating a sand bar. To avoid this problem the catch basin 10 is shown in position between the jetties 16, disposed transversely to the current flow indicated by the arrow 28.

As noted, the apparatus of the invention includes the catch basin 10 and accompanying conduits or pipes 32 which remove the accumulated sand and sediment by the use of pumps 30 capable of transporting such materials. The function of this invention is the disposition of the catch basin 10 in the particular location that is subject to the formation of sand bars to that the flowing current carrying sand and sediment tends to deposit the sand or sediment into the catch basin rather than on to the bottom of the inlet or area where the sand bar typically forms. The accumulated sand can be removed periodically as the catch basin 10 fills as noted above.

It is to be appreciated that the inclination angles of the basin walls in correlation to the basin bottom are preferably determined by the volume of current and level sediment through the area being covered (inlet, estuary, etc.). This positioning (and angles) of walls, the size of the basin, the depth of basin, and physical anchoring position of basin for usage shall be determined by professional engineers associated with each project.

Figure 5:
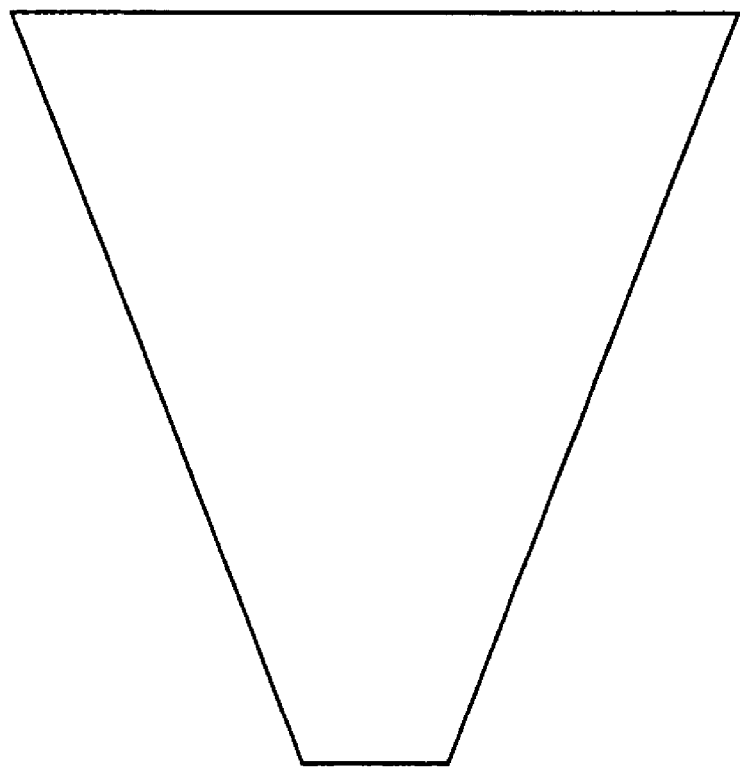
FIGS. 5 through 7 are further embodiments of the invention.
Figure 6:
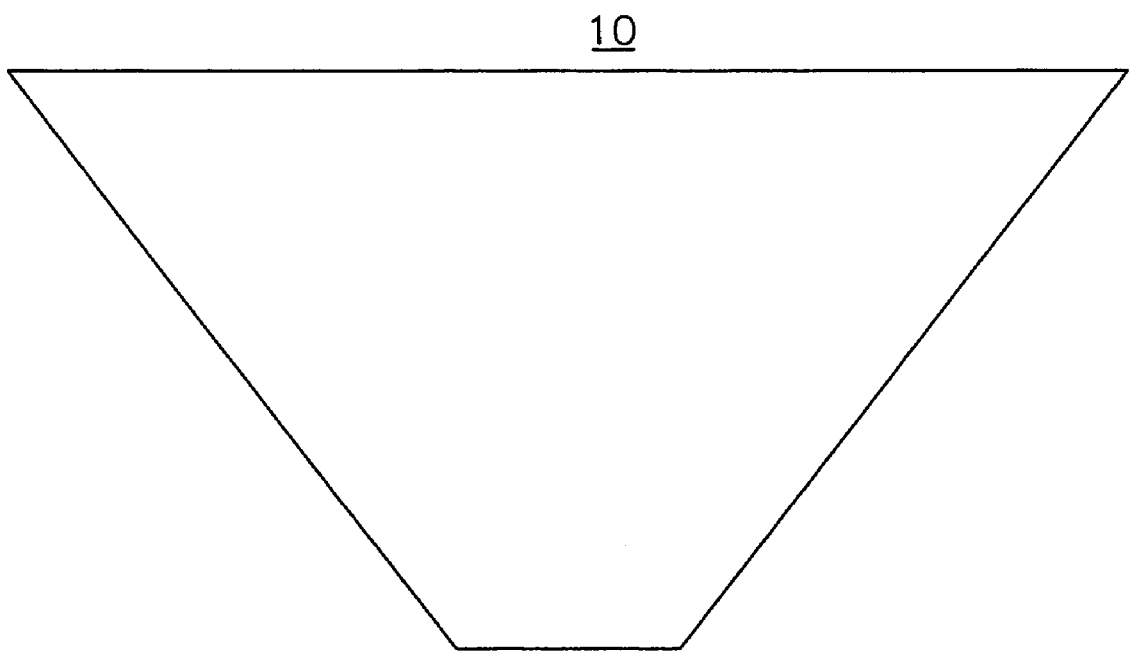
Figure 7:
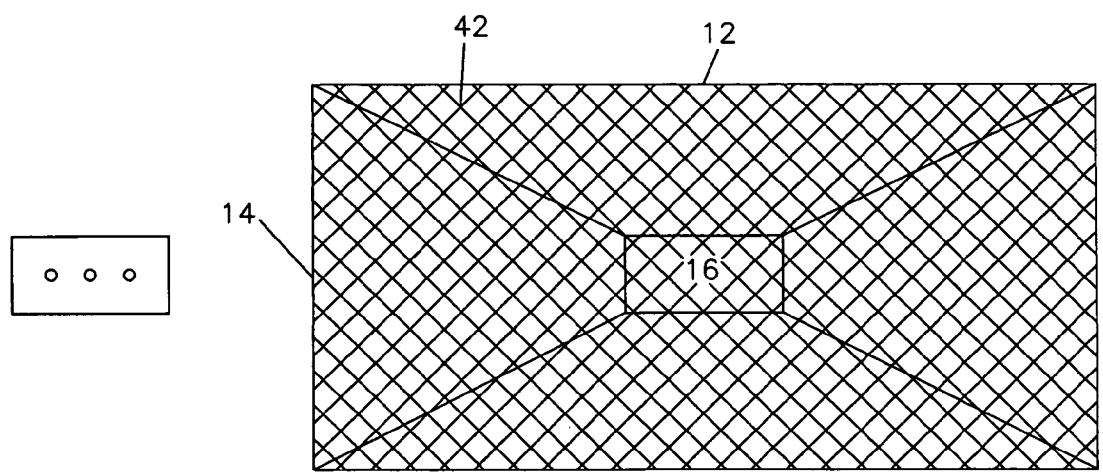
Figure 8:
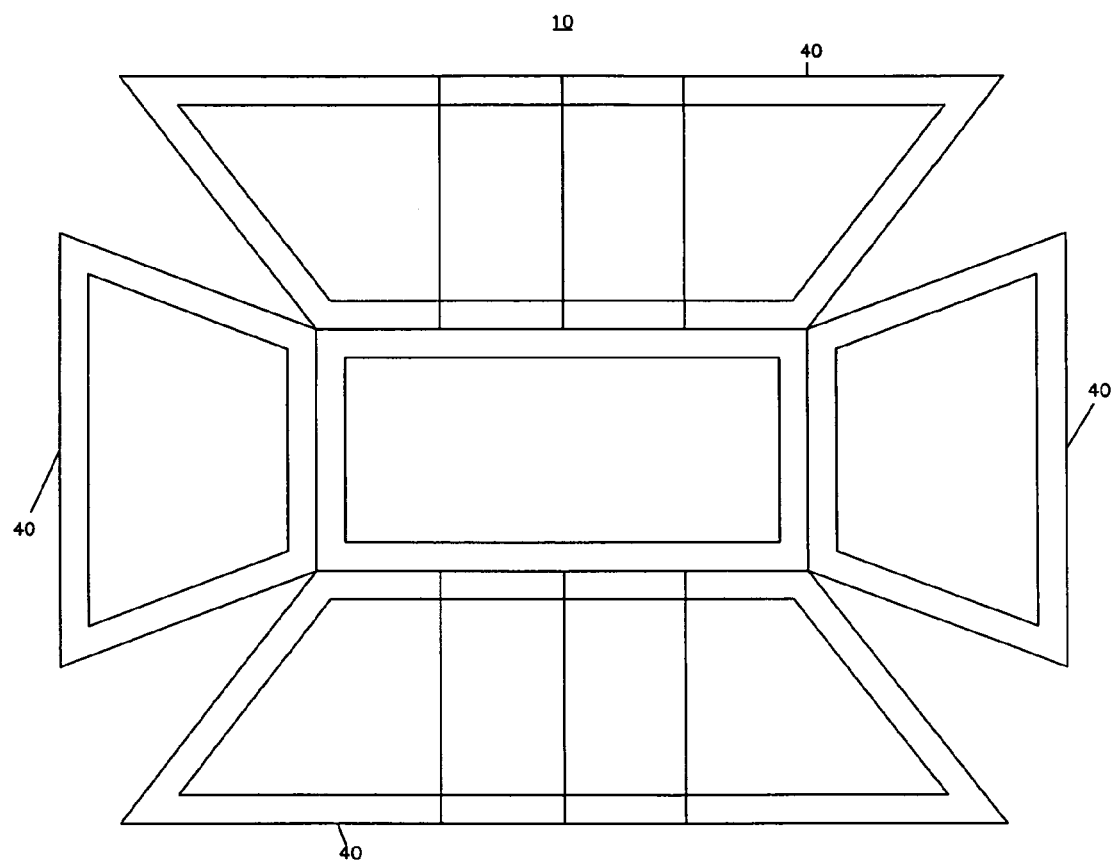
FIGS. 8 through 11 illustrate an embodiment of the invention which is constructed from panels.
Figure 9:
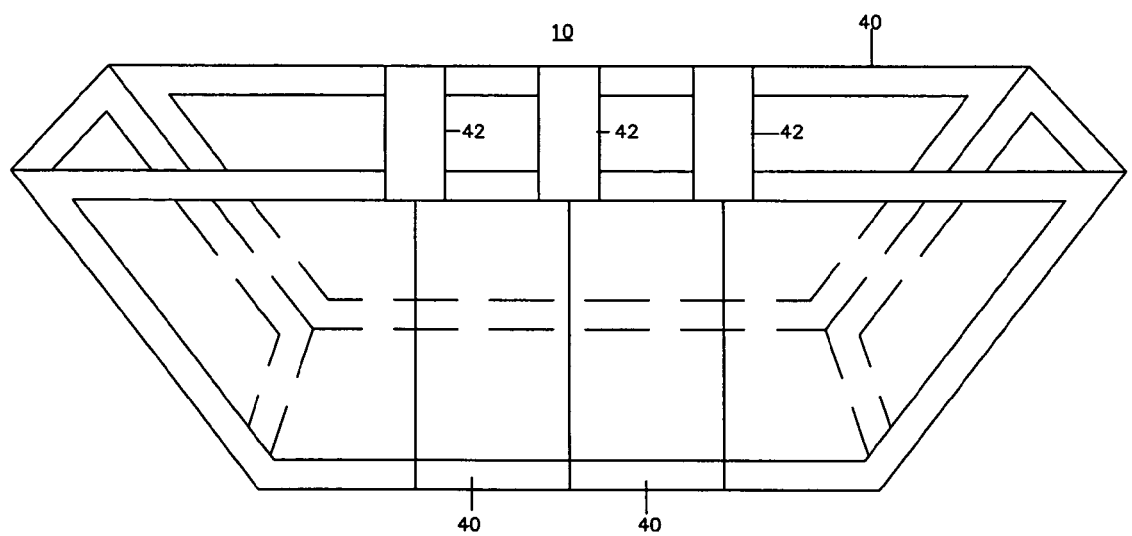

A dimensional diagram of the basin is provided in FIGS. 5, 6 and 7, where examples are given as to approximate dimensions and angles of said basin which is shown as 10 feet wide by 20 feet long. These angles and dimensional sizes may be adjusted accordingly to take into account the different required sizes of basins for appropriate usages of each project. The thickness of walls shall vary based on needed structural support required by flow of current and volume of sediment, as well as composition of the materials used.

Referring to FIGS. 8 to 11, the invention is shown as being fabricated with the use of panels 40 for larger basins. The basin 10 may have unlimited size and shape usage in such application but the basic basin concept defined herewith remains applicable. Because of structural size increases, bracing and/or brackets 42 may be required (as illustrated) to support the additional span openings as illustrated in 9 and 11.

Figure 10:
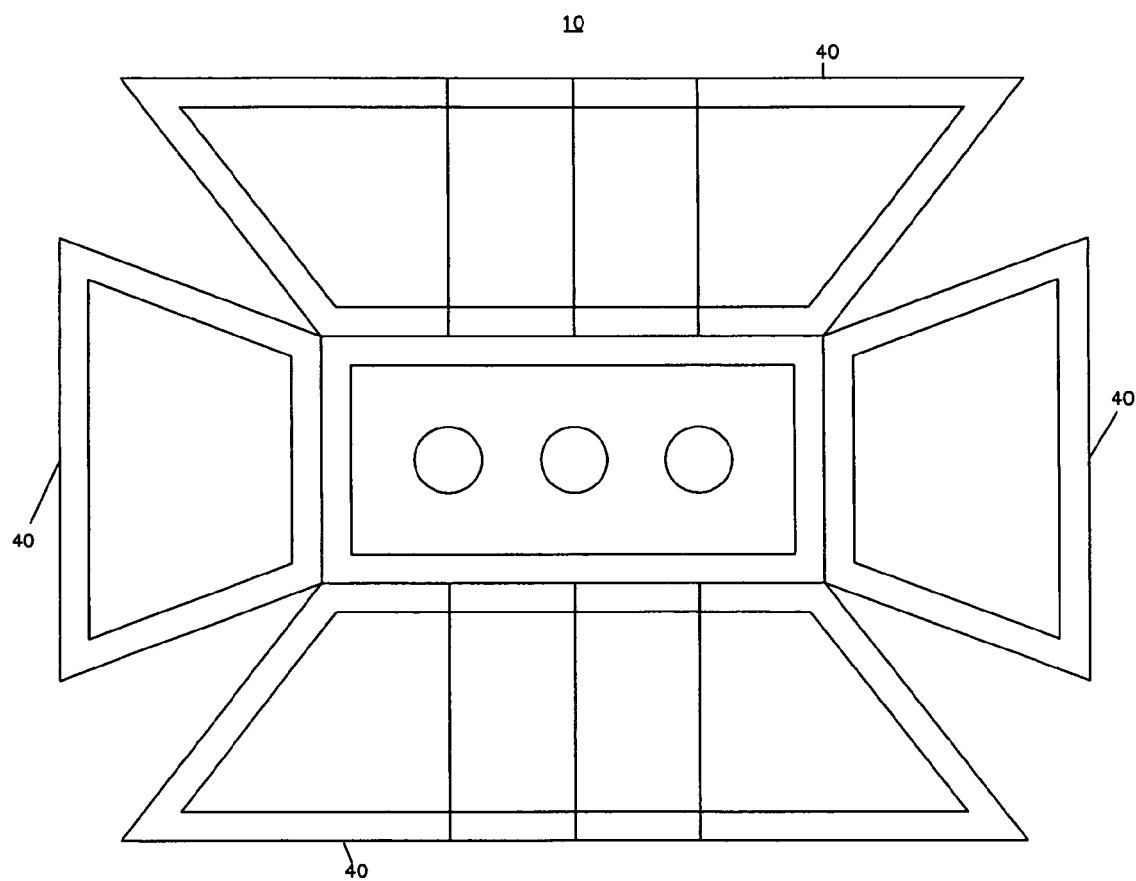
Figure 11:
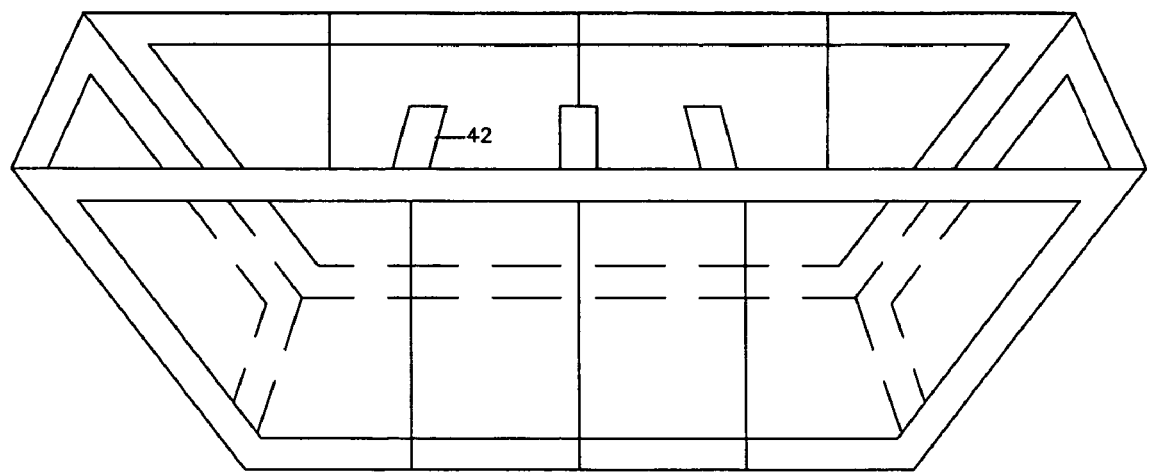

FIG. 10 illustrates the positioning of ports/openings in the bottom of the sectional basin for the direct pumping of sediment and sand below the positioned basin on a permanent basis, if required.

In one embodiment, as shown in FIG. 7, a screen 42 may be placed over the basin to prevent the intrusion of sea life and larger debris, which would be detrimental to the operation of the system and also to protect animal life in the area. Also, an adapter may be placed at appropriate ends of the basin to assist and guide the flow of sand and sediment into the catch basin. See illustration 12 for an example of said guide.

Figure 12:
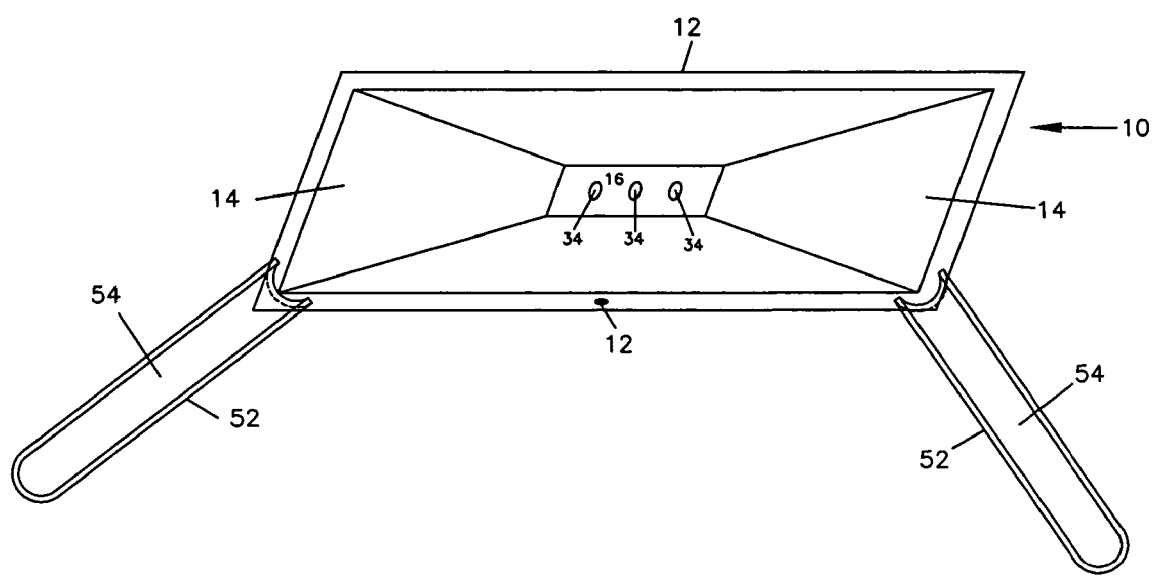
FIG. 12 illustrates a guide mechanism for use with the invention.
Figure 13:
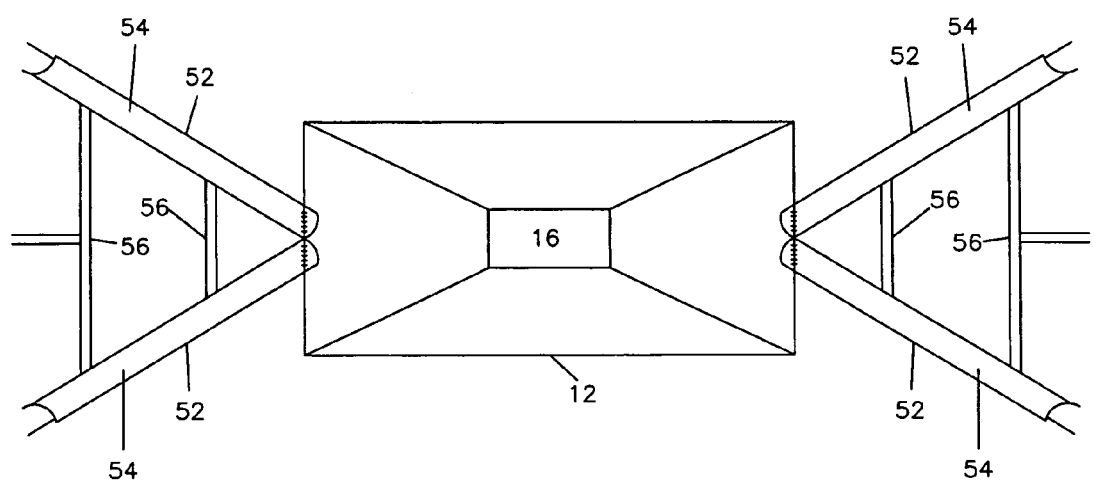
FIG. 13 is an alternative guide mechanism for use with the invention.

FIGS. 12 and 13 illustrate a guide 52 to guide sand and sediment into the basin. The guide 52 is attached to both ends of its basin. FIG. 13 is an alternative guide mechanism.

The guide 52 in a most preferred embodiment comprises one or more angled chutes 54 with curved sidewalls. The cutes 54, in one embodiment, comprise semi-circular members which lie substantially parallel to the direction of flow of the water. As shown in FIG. 13 the chutes 54 may be angled toward the center of the basin and include a frame support structure 56. FIG. 12 shows an embodiment in which the chutes attach at the ends of the basin. While the chutes 54 are shown as being semi-circular, other geometric shapes will work as well.

The present invention has been described with reference to the enclosed detailed description. It is to be appreciated that the true nature and scope of the invention is to be determined with reference to the appended claims.

I claim:

1. A system for collecting the flow of sand or sediment in a current comprising:
    a catch basin, comprising a base structure having a bottom and a plurality of angled side walls, said bottom having at least one aperture;
    an external pipe affixed at a first end to the at least one aperture;
    at least two mechanical guides permanently affixed to one or more ends of the catch basin to direct sand and sediment into the catch basin, each of said guides comprising a chute with curved sidewalls extending substantially parallel to the flow of current; and
    a pumping system affixed to the second end of the external pipe to remove the sediment or sand from the basin.

2. A system for collecting the flow of sand or sediment comprising:
    a catch basin, comprising a plurality of angled side walls which converge with a bottom wall, said catch basin being placed at a predetermined location within a waterway to collect sediment or sand;
    a plurality of apertures on the bottom wall of the catch basin to permit the removal of sediment or sand from the basin;
    a plurality of external pipes, each affixed at a first end to one of said plurality of apertures;
    one or more pumping systems affixed to the second ends of the pipes to remove the sediment or sand from the catch basin;
    a screen affixed over the top of the basin to block debris and prevent the intrusion of sea life; and
    at least two guides affixed to one or more ends of the catch basin to direct sand and sediment into the catch basin, each of said mechanical guides permanently comprising a chute with curved sidewalls extending substantially parallel to the flow of the current.

* * * * *